(12) United States Patent
Otaka et al.

(10) Patent No.: US 11,770,754 B2
(45) Date of Patent: Sep. 26, 2023

(54) NETWORK MANAGEMENT APPARATUS, NETWORK MANAGEMENT METHOD, AND STORAGE MEDIUM FOR NETWORK COMPRISING A PLURALITY OF VEHICLES AND PLURALITY OF MOBILE TERMINALS

(71) Applicant: HONDA MOTOR CO., LTD., Tokyo (JP)

(72) Inventors: Masaru Otaka, Tokyo (JP); Takahiro Iijima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 13 days.

(21) Appl. No.: 17/386,044

(22) Filed: Jul. 27, 2021

(65) Prior Publication Data

US 2022/0038992 A1 Feb. 3, 2022

(30) Foreign Application Priority Data

Aug. 3, 2020 (JP) .................................. 2020-131890

(51) Int. Cl.
*H04W 40/24* (2009.01)
*H04W 4/40* (2018.01)
(Continued)

(52) U.S. Cl.
CPC ........... *H04W 40/246* (2013.01); *H04W 4/40* (2018.02); *H04W 40/28* (2013.01); *H04W 48/16* (2013.01)

(58) Field of Classification Search
CPC ....... H04W 4/40; H04W 48/16; H04W 40/24; H04W 40/246; H04W 40/28
See application file for complete search history.

(56) References Cited

U.S. PATENT DOCUMENTS 6,452,506 B2 * 9/2002 Wilhelm .......... G08G 1/096716
340/904
8,068,016 B2 * 11/2011 Toh ........................ G08G 1/162
340/995.13
(Continued)

FOREIGN PATENT DOCUMENTS

CN         105792310 A      7/2016
JP         2011-019066 A    1/2011
(Continued)

OTHER PUBLICATIONS

Chinese Office Action for Chinese Patent Application No. 202110641891.9 dated Apr. 25, 2023.
(Continued)

*Primary Examiner* — Jenee Holland
(74) *Attorney, Agent, or Firm* — Thomas| Horstemeyer, LLP

(57) ABSTRACT

There is provided a network management apparatus comprising a processor. In a network constituted by a plurality of vehicles and a plurality of mobile terminals having wireless communication functions, a processor detects a vehicle and a mobile terminal which can be used as a next hop of a predetermined vehicle among the plurality of vehicles. The next hop is for predetermined communication originating from or relayed by the predetermined vehicle. When a vehicle which can be used as the next hop is detected, the processor preferentially selects the vehicle that has been detected as the next hop. When a vehicle which can be used as the next hop is not detected and a mobile terminal which can be used as the next hop is detected, the processor selects the mobile terminal that has been detected as the next hop.

13 Claims, 5 Drawing Sheets

(51) Int. Cl.
  *H04W 40/28*   (2009.01)
  *H04W 48/16*   (2009.01)
  *H04W 40/12*   (2009.01)
  *H04W 84/18*   (2009.01)
  *H04W 92/18*   (2009.01)
  *H04W 24/02*   (2009.01)
  *H04W 4/46*    (2018.01)
  *H04W 88/04*   (2009.01)
  *H04W 4/02*    (2018.01)
  *H04W 40/20*   (2009.01)

(56) References Cited

U.S. PATENT DOCUMENTS

| | | | |
|---|---|---|---|
| 8,352,175 B2* | 1/2013 | Bauchot | G01C 21/343 |
| | | | 701/410 |
| 9,036,509 B1* | 5/2015 | Addepalli | H04W 72/20 |
| | | | 701/1 |
| 9,282,485 B2 | 3/2016 | Mizuguchi et al. | |
| 9,896,091 B1* | 2/2018 | Kurt | G05D 1/0088 |
| 10,116,709 B1* | 10/2018 | Kielhofner | H04L 65/80 |
| 10,230,679 B1* | 3/2019 | Kielhofner | H04L 65/1053 |
| 10,568,029 B2 | 2/2020 | Uchiyama | |
| 10,869,276 B1* | 12/2020 | Lekutai | H04W 4/44 |
| 11,272,448 B2 | 3/2022 | Uchiyama | |
| 11,310,638 B2* | 4/2022 | Back | H04L 69/22 |
| 11,632,771 B2* | 4/2023 | Hassan Hussein | H04W 72/23 |
| | | | 370/329 |
| 11,683,754 B2 | 6/2023 | Uchiyama | |
| 2005/0030202 A1* | 2/2005 | Tsuboi | G08G 1/096716 |
| | | | 340/901 |
| 2008/0095134 A1* | 4/2008 | Chen | H04W 40/32 |
| | | | 370/342 |
| 2008/0095163 A1* | 4/2008 | Chen | H04W 84/18 |
| | | | 370/392 |
| 2009/0310608 A1* | 12/2009 | Chen | H04W 4/90 |
| | | | 370/389 |
| 2010/0080168 A1* | 4/2010 | Fukuyama | H04W 8/005 |
| | | | 370/328 |
| 2010/0173603 A1* | 7/2010 | Kwak | G08G 1/164 |
| | | | 455/404.1 |
| 2010/0232404 A1* | 9/2010 | Chen | H04W 4/44 |
| | | | 370/470 |
| 2011/0006913 A1* | 1/2011 | Chen | G08G 1/161 |
| | | | 340/902 |
| 2011/0134840 A1* | 6/2011 | Kim | H04W 40/20 |
| | | | 370/328 |
| 2012/0003921 A1* | 1/2012 | Scopigno | G08G 1/161 |
| | | | 455/3.01 |
| 2013/0130675 A1* | 5/2013 | Yi | H04W 48/20 |
| | | | 455/435.2 |
| 2013/0188513 A1* | 7/2013 | Vasseur | H04W 40/248 |
| | | | 370/254 |
| 2013/0188562 A1* | 7/2013 | Espina Perez | H04L 47/28 |
| | | | 370/328 |
| 2014/0098664 A1 | 4/2014 | Mizuguchi et al. | |
| 2014/0372498 A1* | 12/2014 | Mian | B61L 25/028 |
| | | | 709/201 |
| 2015/0099533 A1* | 4/2015 | Menouar | H04W 64/003 |
| | | | 455/456.1 |
| 2015/0327028 A1* | 11/2015 | Zhang | H04L 67/12 |
| | | | 455/452.1 |
| 2016/0150451 A1* | 5/2016 | Barreto De Miranda Sargento | |
| | | | H04W 36/30 |
| | | | 370/332 |
| 2016/0227380 A1* | 8/2016 | Zhang | H04W 4/90 |
| 2016/0239508 A1* | 8/2016 | Pearson | G06F 16/137 |
| 2016/0241907 A1* | 8/2016 | Pearson | H04L 67/51 |
| 2016/0241976 A1* | 8/2016 | Pearson | G11B 27/11 |
| 2016/0286457 A1* | 9/2016 | O'hare | H04W 24/02 |
| 2017/0039783 A1* | 2/2017 | Hobel | H04L 67/01 |
| 2017/0187620 A1* | 6/2017 | Kielhofner | H04L 65/1104 |
| 2017/0215123 A1* | 7/2017 | Miranda d'Orey | H04W 40/20 |
| 2017/0238346 A1* | 8/2017 | Egner | A61B 5/14503 |
| | | | 370/338 |
| 2017/0280302 A1* | 9/2017 | Dickow | B60R 16/0231 |
| 2017/0289752 A1* | 10/2017 | Onishi | H04W 4/02 |
| 2017/0289896 A1* | 10/2017 | Onishi | H04L 67/12 |
| 2018/0049274 A1* | 2/2018 | Kim | H04W 36/245 |
| 2018/0084369 A1* | 3/2018 | Hou | H04W 4/40 |
| 2018/0124805 A1* | 5/2018 | Tonshal | H04W 72/1205 |
| 2018/0234822 A1* | 8/2018 | Liang | H04M 3/54 |
| 2018/0276925 A1* | 9/2018 | Hayashi | H04Q 9/00 |
| 2018/0276926 A1* | 9/2018 | Hayashi | E05B 81/78 |
| 2018/0281657 A1* | 10/2018 | Healey | G06Q 10/08 |
| 2018/0324694 A1 | 11/2018 | Uchiyama | |
| 2019/0052915 A1* | 2/2019 | Mcquillen | H04N 21/2146 |
| 2019/0141495 A1* | 5/2019 | Jha | H04L 45/306 |
| 2019/0335532 A1* | 10/2019 | Kim | H04W 72/12 |
| 2020/0178174 A1 | 6/2020 | Uchiyama | |
| 2020/0267637 A1* | 8/2020 | Veloso | H04B 17/318 |
| 2020/0412635 A1* | 12/2020 | Jha | H04L 45/02 |
| 2021/0037272 A1* | 2/2021 | Ghessassi | H04N 21/2146 |
| 2021/0153099 A1* | 5/2021 | Back | H04L 45/745 |
| 2021/0264383 A1* | 8/2021 | Kleinhans | G07C 5/008 |
| 2021/0314843 A1* | 10/2021 | Yang | H04W 4/40 |
| 2021/0321323 A1* | 10/2021 | Ge | H04L 67/12 |
| 2022/0007132 A1* | 1/2022 | Ivanov | G01C 11/04 |
| 2022/0132319 A1* | 4/2022 | Mccallen | H04W 48/16 |
| 2022/0141874 A1* | 5/2022 | Bhargava | H04W 40/22 |
| | | | 370/315 |
| 2022/0191791 A1 | 6/2022 | Uchiyama | |
| 2022/0279335 A1* | 9/2022 | Fujii | H04W 4/80 |
| 2022/0303864 A1* | 9/2022 | Arngren | H04W 40/20 |

FOREIGN PATENT DOCUMENTS

| | | |
|---|---|---|
| JP | 2015-103037 A | 6/2015 |
| JP | 2017-139659 A | 8/2017 |
| JP | 2018-157249 A | 10/2018 |
| JP | 6528711 B2 | 6/2019 |
| WO | 2013/008448 A1 | 1/2013 |
| WO | 2016/002527 A1 | 1/2016 |
| WO | 2019/239505 A1 | 12/2019 |

OTHER PUBLICATIONS

Japanese Office Action for Japanese Patent Application No. 2020-131890 dated Jun. 30, 2023.

* cited by examiner

NETWORK MANAGEMENT APPARATUS, NETWORK MANAGEMENT METHOD, AND STORAGE MEDIUM FOR NETWORK COMPRISING A PLURALITY OF VEHICLES AND PLURALITY OF MOBILE TERMINALS

CROSS-REFERENCE TO RELATED APPLICATION(S)

This application claims priority to and the benefit of Japanese Patent Application No. 2020-131890 filed on Aug. 3, 2020, the entire disclosure of which is incorporated herein by reference.

BACKGROUND OF THE INVENTION

Field of the Invention

The present invention relates to a network management apparatus, a network management method, and a storage medium.

Description of the Related Art

Techniques for configuring networks using a plurality of vehicles capable of executing wireless vehicle-to-vehicle communication are known (see Japanese Patent No. 6528711).

Depending on the positional relationship between vehicles, it may not be possible to find a vehicle which can be used as the next hop (in routing, a direct transfer destination) for a specific vehicle on the network, resulting in the communication being delayed or cut off.

SUMMARY OF THE INVENTION

Having been achieved in light of such circumstances, the present invention provides a technique for improving the stability of communication over a network that includes a plurality of vehicles.

According to an aspect of the present invention, there is provided a network management apparatus comprising a processor configured to: in a network constituted by a plurality of vehicles and a plurality of mobile terminals having wireless communication functions, detect a vehicle and a mobile terminal which can be used as a next hop of a predetermined vehicle among the plurality of vehicles, the next hop being for predetermined communication originating from or relayed by the predetermined vehicle; and when a vehicle which can be used as the next hop is detected, preferentially select the vehicle that has been detected as the next hop, and when a vehicle which can be used as the next hop is not detected and a mobile terminal which can be used as the next hop is detected, select the mobile terminal that has been detected as the next hop.

DESCRIPTION OF THE EMBODIMENTS

Figure 1:
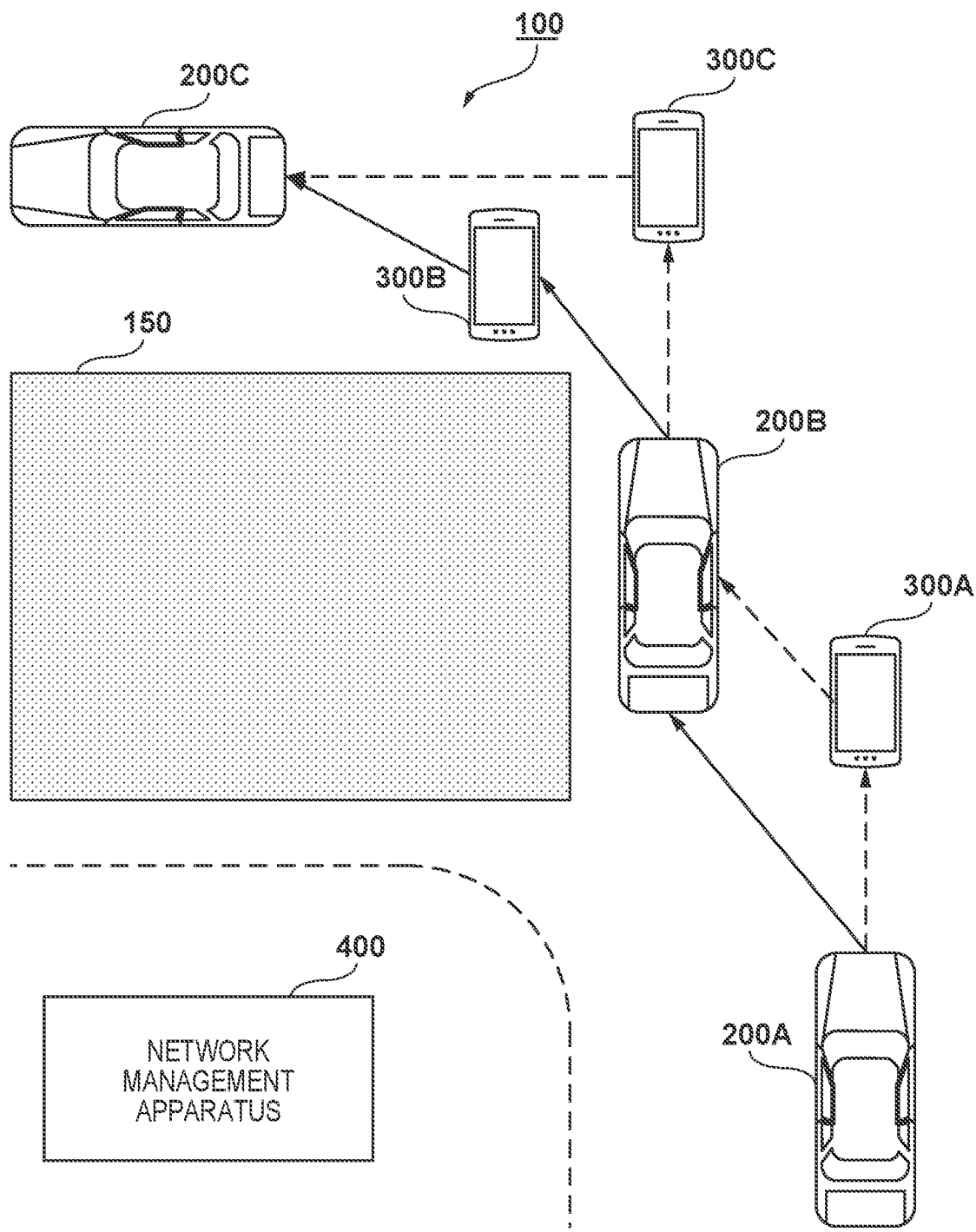
FIG. 1 is a conceptual diagram illustrating a network 100 constituted by a plurality of vehicles and a plurality of mobile terminals having wireless communication functions.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a conceptual diagram illustrating a network 100 constituted by a plurality of vehicles and a plurality of mobile terminals having wireless communication functions. The network 100 is configured as a mesh network, for example. However, the specific configuration of the network 100 is not particularly limited, and any network configuration which performs routing by multi-hop communication can be employed. Additionally, although FIG. 1 illustrates three vehicles (vehicles 200A, 200B, and 200C) and three mobile terminals (mobile terminals 300A, 300B, and 300C), the numbers of vehicles and mobile terminals are not particularly limited. In the following descriptions, each vehicle in the network 100 will be called a "vehicle 200" when there is no need to distinguish the individual vehicles. Likewise, each mobile terminal in the network 100 will be called a "mobile terminal 300" when there is no need to distinguish the individual mobile terminals. The specific configurations of the vehicles 200 and the mobile terminals 300 will be described later.

A network management apparatus 400 manages the network 100 (makes route settings and the like). Although the network management apparatus 400 is indicated as a block that is separate from the vehicles 200 and the mobile terminals 300 in FIG. 1, the hardware configuration for implementing the network management apparatus 400 is not particularly limited. As one example, the network management apparatus 400 is configured as a server which is connected to the Internet and which communicates with the vehicles 200 and the mobile terminals 300 over the Internet. As another example, the network management apparatus 400 may be included in each of the vehicles 200. In this case, the network management apparatuses 400 of the plurality of vehicles 200 (or only some thereof) included in the network 100 operate in tandem as necessary. As yet another example, the network management apparatus 400 may be included in each of the vehicles 200 and the mobile terminals 300. In this case, the network management apparatuses 400 of the plurality of vehicles 200 and the plurality of mobile terminals 300 (or only some thereof) included in the network 100 operate in tandem as necessary.

In FIG. 1, the solid line arrows indicate an example of a route set by the network management apparatus 400. The broken line arrows indicate another example of a route set by the network management apparatus 400. Route setting processing will be described in detail later.

A blocking object 150 is an object that blocks radio waves of the communication system used in the communication among the vehicles 200, and is a building, a wall, or the like, for example.

Figure 2:
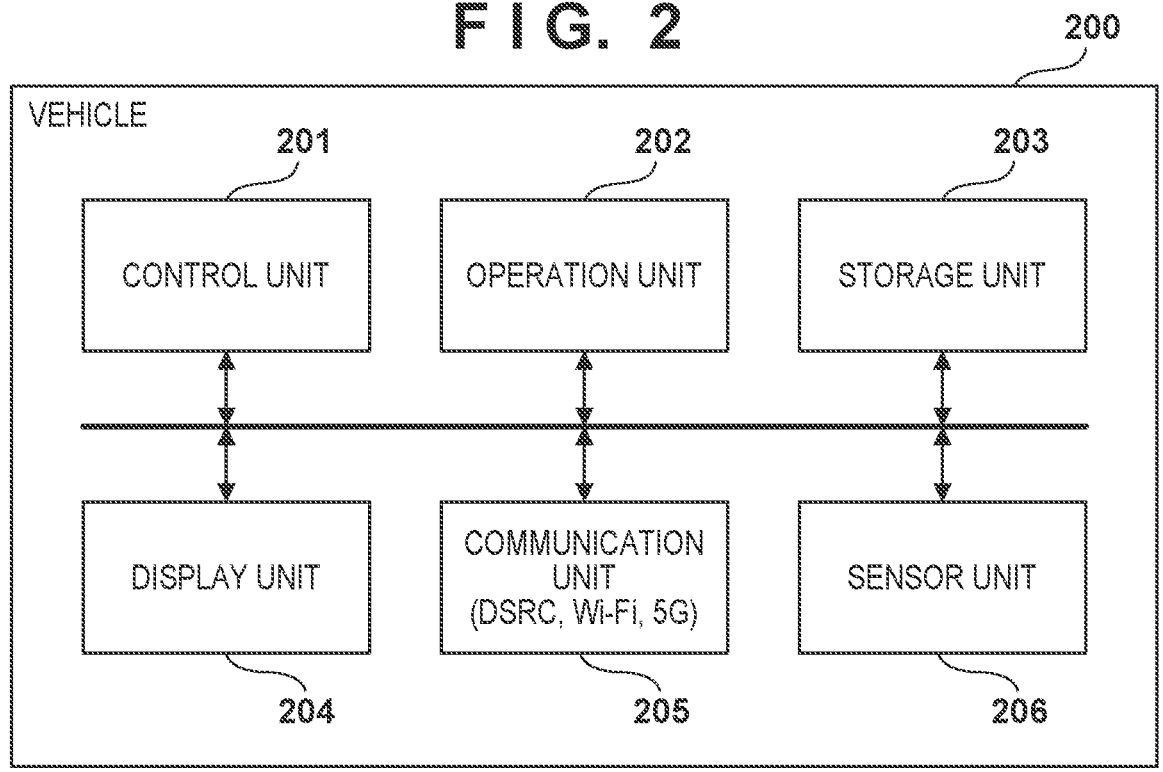
FIG. 2 is a function block diagram illustrating a vehicle 200.

FIG. 2 is a function block diagram illustrating the vehicle 200. This drawing mainly illustrates the function blocks related to the wireless communication function of the vehicle 200, and omits function blocks related to the vehicle 200 functioning as a car (an engine and the like). Additionally, some or all of the function blocks illustrated in FIG. 2 may be implemented in an in-vehicle apparatus which can be mounted in and removed from the vehicle 200.

A control unit 201 includes a CPU, ROM, and RAM, for example, and controls the vehicle 200 as a whole (or the in-vehicle apparatus as a whole) by executing various types of programs. An operation unit 202 includes input devices such as buttons, a touch panel, and the like, and accepts input operations made by a user. A storage unit 203 includes a recording medium such as an HDD, an SDD, or the like, for example, and stores various types of programs. A display unit 204 includes, for example, a liquid crystal display, and displays a user interface, various types of information, and the like.

A communication unit 205 is a communication unit having a wireless communication function with which the vehicle 200 communicates with an external apparatus (another vehicle 200, a mobile terminal 300, the network management apparatus 400, or the like). The communication unit 205 may be compliant with a plurality of communication systems, such as Dedicated Short-Range Communications (DSRC), Wi-Fi, 4G, and 5G. In this case, the communication unit 205 may use DSRC for communication with other vehicles 200, Wi-Fi for communication with mobile terminals 300, and 5G for communication with the network management apparatus 400. Alternatively, the communication unit 205 may use the same communication system (e.g., Wi-Fi) for communication with other vehicles 200 and mobile terminals 300. Alternatively, the communication unit 205 may use C-V2X (Cellular V2X) for communication with other vehicles 200.

A sensor unit 206 includes, for example, GPS, an accelerometer, a gyroscope, a magnetism sensor, and the like. The control unit 201 can recognize the position, travel direction, and the like of the vehicle 200 on the basis of data obtained by the sensor unit 206.

Figure 3:
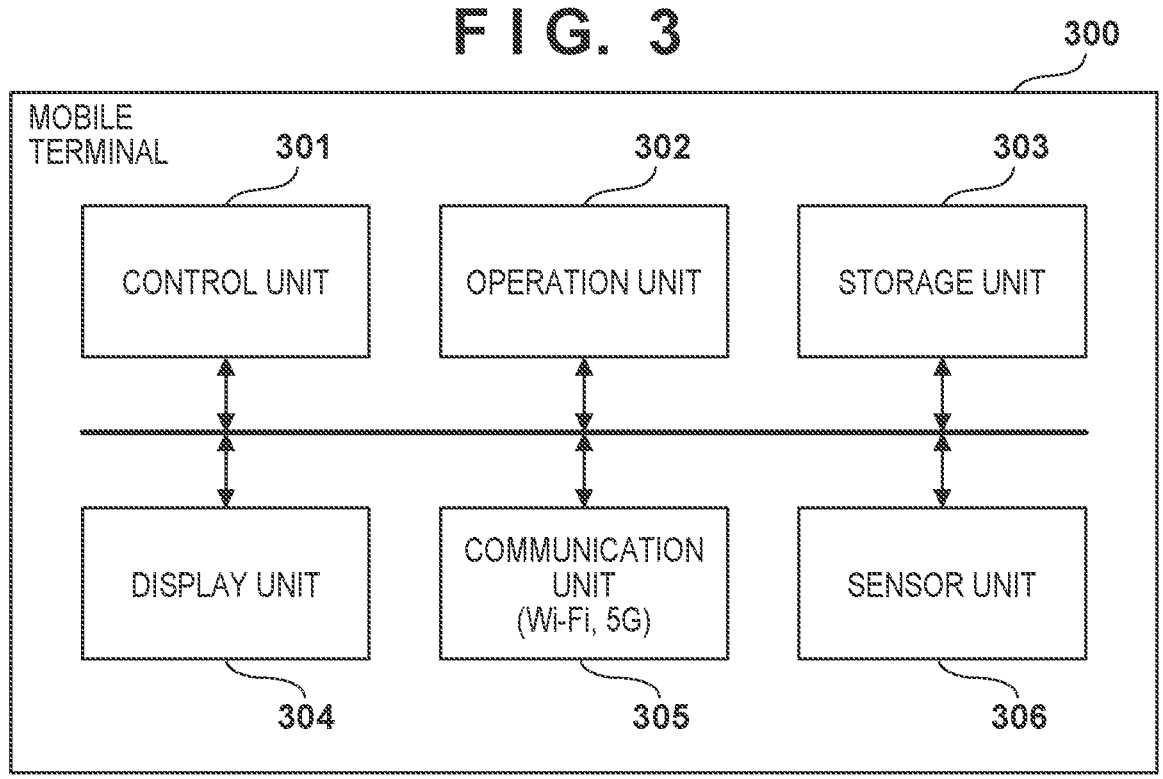
FIG. 3 is a function block diagram illustrating a mobile terminal 300.

FIG. 3 is a function block diagram illustrating the mobile terminal 300. The mobile terminal 300 is, for example, a smartphone, but may be another type of device having a wireless communication function (e.g., a tablet, a digital camera, or the like).

A control unit 301 includes a CPU, ROM, and RAM, for example, and controls the mobile terminal 300 as a whole by executing various types of programs. An operation unit 302 includes input devices such as buttons, a touch panel, and the like, and accepts input operations made by a user. A storage unit 303 includes a recording medium such as an HDD, an SDD, or the like, for example, and stores various types of programs. A display unit 304 includes, for example, a liquid crystal display, and displays a user interface, various types of information, and the like.

A communication unit 305 is a communication unit having a wireless communication function with which the mobile terminal 300 communicates with an external apparatus (a vehicle 200, another mobile terminal 300, the network management apparatus 400, or the like). The communication unit 305 may be compliant with a plurality of communication systems, such as Wi-Fi, 4G, and 5G. In this case, the communication unit 305 may use Wi-Fi for communication with the vehicles 200 and the mobile terminals 300, and 5G for communication with the network management apparatus 400.

A sensor unit 306 includes, for example, GPS, an accelerometer, a gyroscope, a magnetism sensor, and the like. The control unit 301 can recognize the position, travel direction, and the like of the mobile terminal 300 on the basis of data obtained by the sensor unit 306.

Figure 4:
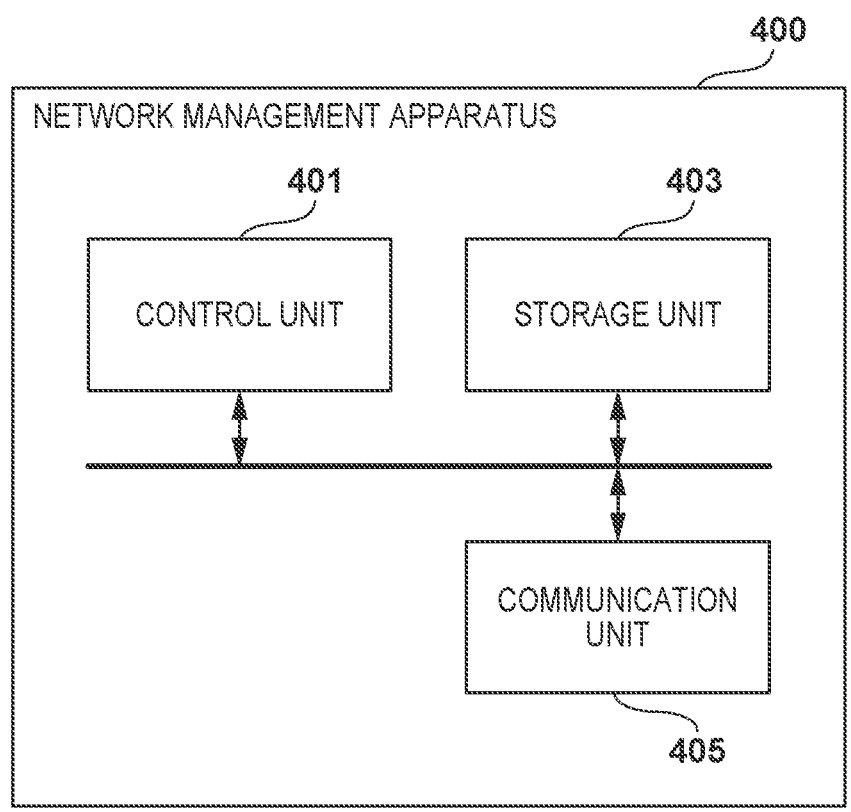
FIG. 4 is a function block diagram illustrating a network management apparatus 400.

FIG. 4 is a function block diagram illustrating the network management apparatus 400. A control unit 401 includes a CPU, ROM, and RAM, for example, and controls the network management apparatus 400 as a whole by executing various types of programs. A storage unit 403 includes a recording medium such as an HDD, an SDD, or the like, for example, and stores various types of programs.

A communication unit 405 is a communication unit with which the network management apparatus 400 communicates with the vehicles 200 and the mobile terminals 300. As described earlier, the network management apparatus 400 may be configured as a server which is connected to the Internet. In this case, the network management apparatus 400 uses the communication unit 405 to connect to the Internet and communicate with the vehicles 200 and the mobile terminals 300 over the Internet. Alternatively, as described earlier, the network management apparatus 400 may be included in each of the vehicles 200 and the mobile terminals 300. In this case, the function blocks illustrated in FIGS. 2 and 3 may also implement the roles of the function blocks illustrated in FIG. 4 (e.g., the control unit 201 and the control unit 301 may implement the role of the control unit 401).

Figure 5:
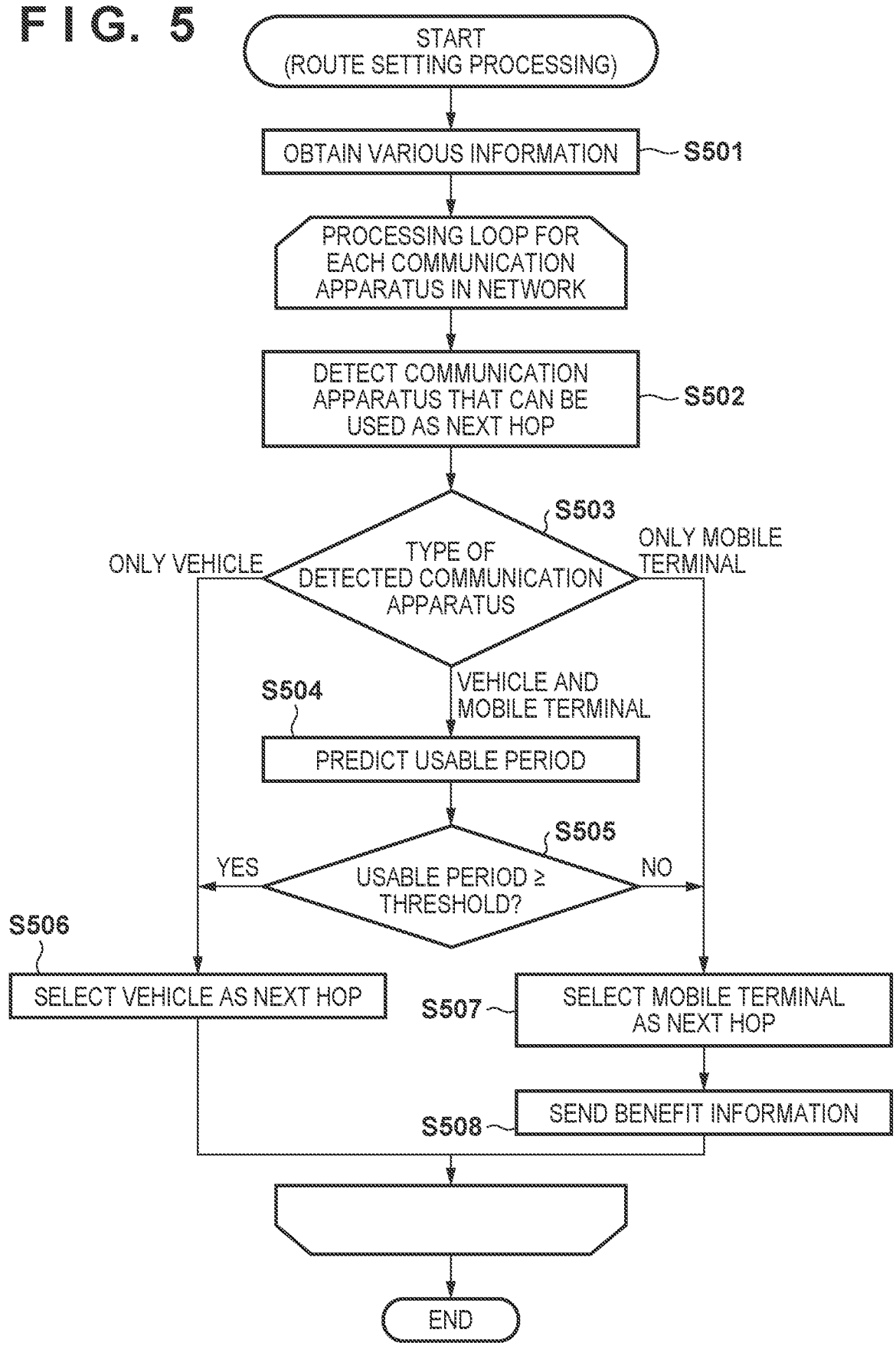
FIG. 5 is a flowchart illustrating route setting processing executed by the network management apparatus 400.

FIG. 5 is a flowchart illustrating route setting processing executed by the network management apparatus 400. Although the following will describe an example of route setting for implementing communication from the vehicle 200A to the vehicle 200C as illustrated in FIG. 1, the origin and destination of the communication in the present embodiment are not particularly limited. Additionally, the origin and the destination may be communication apparatuses outside the network 100. For example, communication originating from the vehicle 200A may be transferred to the vehicle 200C by being relayed within the network 100, and may then be transferred to a destination communication terminal outside the network 100 from the vehicle 200C.

In step S501, by communicating with the various communication apparatuses in the network 100 via the communication unit 405 (the vehicles 200 and the mobile terminals 300), the control unit 401 obtains various types of information for route setting from the respective communication apparatuses. The control unit 401 stores the obtained various types of information in the storage unit 403.

The various types of information for route setting include, for example, position information, travel direction information, radio wave strength information (e.g., a Received Signal Strength Indicator (RSSI)), and the like. For example, position information of the vehicle 200A, travel direction information of the vehicle 200A, and radio wave strength information pertaining to communication apparatuses in the vicinity of the vehicle 200A (the vehicle 200B and the mobile terminal 300A) are included in the various types of information for route setting obtained from the vehicle 200A by the control unit 401.

Note that by periodically obtaining and storing the various types of information for route setting in advance, the control unit 401 may perform control such that the storage unit 403 always holds the newest various types of information.

Steps S502 to S508 are executed for each communication apparatus in the network 100 as a communication apparatus subject to processing (a target communication apparatus).

In step S502, on the basis of the various types of information for route setting stored in the storage unit 403, the control unit 401 detects a communication apparatus (vehicle and mobile terminal) which can be used as a next hop for the target communication apparatus in the network 100. "Next hop" refers to a direct transfer destination in the network routing. For example, with an IP network, the next hop is set by recording the IP address of a transfer destination in a routing table. However, the network 100 in the present embodiment is not limited to an IP network, and the specific method for setting the next hop is not particularly limited, either.

For example, when the target communication apparatus is the vehicle 200A, the control unit 401 can detect the communication apparatus which can be used as the next hop on the basis of (i) the position of the vehicle 200A and (ii) the position of at least one of the plurality of vehicles 200 aside from the vehicle 200A and the plurality of mobile terminals 300. Alternatively, the control unit 401 can detect the communication apparatus which can be used as the next hop on the basis of the radio wave strength for wireless communication (e.g., the RSSI) between (i) the vehicle 200A and (ii) at least one of the plurality of vehicles 200 aside from the vehicle 200A and the plurality of mobile terminals 300. In the example illustrated in FIG. 1, the vehicle 200B and the mobile terminal 300A are detected as communication apparatuses which can be used as the next hop for the vehicle 200A. Likewise, when the target communication apparatus is the vehicle 200B, the mobile terminal 300B and the mobile terminal 300C are detected.

In step S503, the type of the communication apparatus detected in step S502 is determined. The sequence moves to step S504 if both a vehicle and a mobile terminal have been detected; to step S506, if only a vehicle has been detected; and to step S507, if only a mobile terminal has been detected. For example, when the target communication apparatus is the vehicle 200A, the vehicle 200B and the mobile terminal 300A are detected, and thus the sequence moves to step S504. Likewise, when the target communication apparatus is the vehicle 200B, the mobile terminal 300B and the mobile terminal 300C are detected, and thus the sequence moves to step S507.

In step S504, the control unit 401 predicts a communication stability, as a next hop, for the vehicle detected in step S502. Here, "communication stability" is information serving as an indicator of the stability of communication when the vehicle detected in step S502 is used as the next hop. In the following descriptions, a period for which the vehicle detected in step S502 is continuously usable as the next hop (a usable period) is assumed to be used as the communication stability. However, the communication stability is not limited to the usable period, and may be the throughput of communication between the vehicle detected in step S502 and the target communication apparatus, for example. Although the method for predicting the usable period is not particularly limited, the control unit 401 may predict the usable period on the basis of the various types of information for route setting stored in the storage unit 403.

Consider a case of predicting the usable period of the vehicle 200B with respect to the vehicle 200A, for example. In this case, the control unit 401 can predict the usable period on the basis of at least one of the relative position of the vehicle 200A (the position of the vehicle 200A and the position of the vehicle 200B), the relative travel direction of the vehicle 200A (the travel direction of the vehicle 200A and the travel direction of the vehicle 200B), and the radio wave strength. For example, a longer usable period is predicted when the positions of the vehicle 200A and the vehicle 200B are close to each other and the travel directions are the same than when the positions of the vehicle 200A and the vehicle 200B are far from each other and the travel directions are opposite from each other.

In step S505, the control unit 401 determines whether or not the usable period (communication stability) predicted in step S504 is greater than or equal to a threshold. The sequence moves to step S506 when the usable period is greater than or equal to the threshold, and to step S507 when the usable period is less than the threshold.

In step S506, the control unit 401 selects the vehicle detected in step S502 as the next hop for the target communication apparatus. If a plurality of vehicles have been detected, the control unit 401 selects one of the plurality of detected vehicles as the next hop on the basis of the various types of information for route setting stored in the storage unit 403.

In step S507, the control unit 401 selects the mobile terminal detected in step S502 as the next hop for the target communication apparatus. If a plurality of mobile terminals have been detected, the control unit 401 selects one of the plurality of detected mobile terminals as the next hop on the basis of the various types of information for route setting stored in the storage unit 403.

Additionally, when the plurality of detected mobile terminals include one or more mobile terminals connected to the network 100 by using the target communication apparatus as an access point, the control unit 401 may select the next hop from among those one or more mobile terminals. Consider, for example, a case where the mobile terminal 300B is using the vehicle 200B as an access point, but the mobile terminal 300C is not using the vehicle 200B as an access point. In this case, of the mobile terminal 300B and the mobile terminal 300C, which can be used as the next hop for the vehicle 200B, the mobile terminal 300B is selected as the next hop. In other words, the mobile terminal 300B, which is selected by the control unit 401 as the next hop for the vehicle 200B, is a mobile terminal connected to the network 100 by using the vehicle 200B as an access point. This establishes a reciprocal relationship in which the vehicle 200B functions as an access point for the mobile terminal 300B and the mobile terminal 300B functions as a relay for the vehicle 200B.

The foregoing descriptions pertaining to step S507 discuss the control unit 401 as being capable of selecting a mobile terminal as the next hop, and do not mean that the control unit 401 must select a mobile terminal as the next hop. The control unit 401 may refrain from selecting a mobile terminal as the next hop depending on the circumstances (e.g., when the power remaining in the battery of the detected mobile terminal is low). In this case, the control unit 401 may abstain from setting the communication route, or may attempt to set the communication route using some other method (e.g., setting the communication route to go through a 5G network).

In step S508, the control unit 401 provides (sends) benefit information to the mobile terminal 300 selected as the next hop. The "benefit information" is some kind of information thought to have value for the user of the mobile terminal 300, such as a discount coupon for a product. Accordingly, the user can obtain the benefit information as compensation for their own mobile terminal 300 being used as a relay in the network 100.

Through the foregoing processing, the next hop for communication from the vehicle 200A to the vehicle 200C is selected for each communication apparatus in the network 100, and a communication route is established as a result.

Note, however, that it is not absolutely necessary for the next hop to be selected for all of the communication apparatuses in the network 100. For example, when the next hop is selected for the mobile terminal 300A, the vehicle 200B is selected, but when the vehicle 200B is selected as the next hop for the vehicle 200A, there is no need for the mobile terminal 300A to relay the communication. Accordingly, in this case, the selection of the next hop for the mobile terminal 300A may be skipped.

The technical significance of the conditional branching in step S505 will be described here. The vehicles 200 and the mobile terminals 300 consume power in order to relay communications. Typically, the vehicles 200 are provided with high-capacity batteries (and may also be provided with generators), whereas the mobile terminals 300 have relatively low battery capacities. Accordingly, when, for example, the target communication apparatus is the vehicle 200A, and the vehicle 200B and the mobile terminal 300A can be used as the next hop, selecting the vehicle 200B as the next hop makes it possible to suppress power consumption by the mobile terminal 300A, which has a low battery capacity. However, if the vehicle 200B is selected as the next hop when the usable period of the vehicle 200B with respect to the vehicle 200A is short (when the vehicle 200A and the vehicle 200B are traveling in opposite directions or the like), the communication route may be cut off after a short amount of time. Therefore, when the usable period of the vehicle 200B is less than the threshold, selecting the mobile terminal 300A makes it possible to improve the communication stability. However, if suppressing the power consumption of the mobile terminal 300A is to be prioritized over communication stability, the processes of steps S504 and S505 may be skipped. In this case, the sequence moves from step S503 to step S506 if both a vehicle and a mobile terminal have been detected in step S502.

Incidentally, even if the mobile terminal 300A has been selected as the next hop of the vehicle 200A, the communication route may be cut off due to movement of the vehicle 200A and the mobile terminal 300A. However, because the mobile terminal 300A typically moves more slowly than the vehicle 200B, selecting the mobile terminal 300A over the vehicle 200B can be expected to provide relatively stable communication. The communication stability also differs depending on the communication system. For example, Wi-Fi is typically less susceptible to obstructions, and provides higher communication stability, than DSRC. Accordingly, when, for example, DSRC is used for the communication between the vehicle 200A and the vehicle 200B but Wi-Fi is used for the communication between the vehicle 200A and the mobile terminal 300A, selecting the mobile terminal 300A can be expected to improve the communication stability, even taking into account the possibility that the mobile terminal 300A will move.

Switching the next hop in response to detecting a blocking object will be described next, referring again to FIG. 1. As described earlier, the blocking object 150 is an object that blocks radio waves of the communication system used for the communication among the vehicles 200 (assumed here to be DSRC). As such, when the blocking object 150 is detected in the vicinity of a specific vehicle 200, the communication with the other vehicles 200 may be destabilized.

For example, consider a situation in which, in FIG. 1, the vehicle 200B and the mobile terminal 300B are detected as communication apparatuses which can be used as the next hop for the vehicle 200A, and the vehicle 200B has been selected. It is assumed here that DSRC is used for the communication between the vehicle 200A and the vehicle 200B, and that Wi-Fi is used for the communication between the vehicle 200A and the mobile terminal 300B. At the point in time illustrated in FIG. 1, the blocking object 150 is somewhat distant from the vehicle 200A, and the blocking object 150 is therefore not detected in the vicinity of the vehicle 200A. When the vehicle 200A then advances slightly, the blocking object 150 is detected in the vicinity of the vehicle 200A. However, when the vehicle 200B then makes a left turn, the blocking object 150 is positioned between the vehicle 200A and the vehicle 200B, which may result in the communication being cut off despite the vehicle 200A and the vehicle 200B being close to each other. Accordingly, when the blocking object 150 is detected in the vicinity of the vehicle 200A and the mobile terminal 300A has been detected as being usable as the next hop, the control unit 401 switches the next hop to the mobile terminal 300A (even if communication with the vehicle 200B is possible at that point in time). This makes it possible to reduce the likelihood of the communication route being cut off.

The method by which the control unit 401 detects the blocking object is not particularly limited. For example, the control unit 401 may detect blocking objects in the vicinity of the vehicle 200 by referring to map information stored in the storage unit 403. As another example, the control unit 401 may obtain an image captured by an in-vehicle camera (an image capturing unit) (not shown) of the vehicle 200 via the communication unit 405, and detect a blocking object in the vicinity of the vehicles 200 by analyzing the image. As yet another example, the control unit 401 may obtain information detected by radar (not shown) of the vehicle 200 via the communication unit 405, and detect a blocking object in the vicinity of the vehicles 200 by analyzing the information. As still another example, the control unit 401 may obtain information detected by lidar (not shown) of the vehicle 200 via the communication unit 405, and detect a blocking object in the vicinity of the vehicles 200 by analyzing the information.

Figure 6:
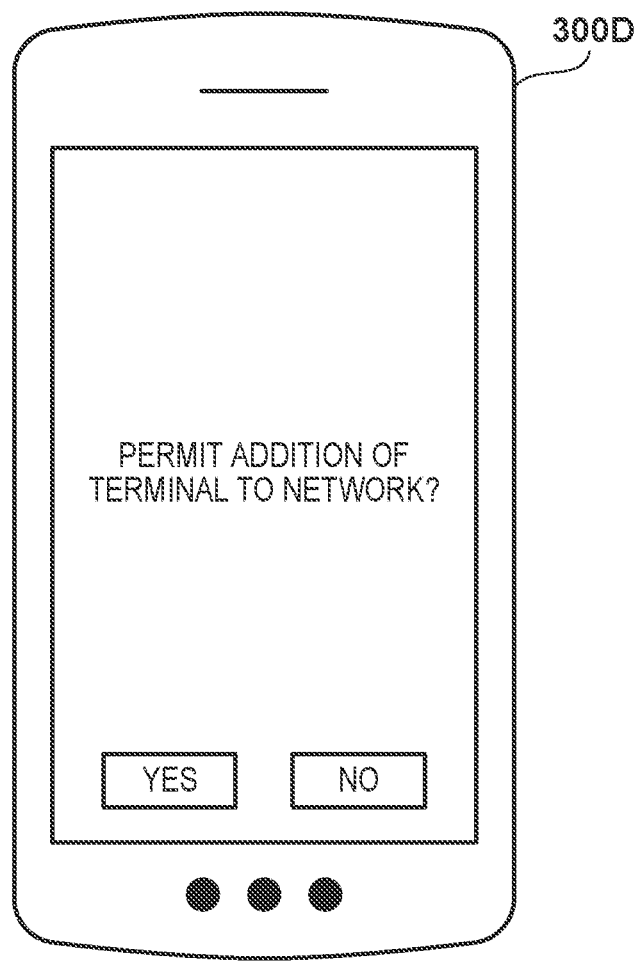
FIG. 6 is a diagram illustrating an example of a message screen displayed by a connection app.

Processing through which the network management apparatus 400 obtains permission to add a mobile terminal 300D, which is not a constituent element of the network 100, as a constituent element of the network 100 will be described next with reference to FIG. 6.

Software for connecting to the network 100 by using a vehicle 200 of the network 100 as an access point (a connection app) is installed in the mobile terminal 300D. When the user performs an operation for connecting the mobile terminal 300D to the network 100, the connection app displays, in the display unit 304 of the mobile terminal 300D, a message screen requesting permission to add the mobile terminal 300D as a constituent element of the network 100. FIG. 6 is a diagram illustrating an example of the message screen displayed by the connection app. When the user selects "yes" in the message screen, the mobile terminal 300D sends permission information indicating permission to add the mobile terminal 300D as a constituent element of the network 100. The control unit 401 of the network management apparatus 400 receives the permission information via the communication unit 405.

The control unit 401 of the network management apparatus 400 adds the mobile terminal 300D as a constituent element of the network 100 in response to receiving the permission information from the mobile terminal 300D. As a result, the mobile terminal 300D is then subject to the route setting processing illustrated in FIG. 5. Additionally, the control unit 401 performs control so that the mobile terminal 300D permits the use of one of the plurality of vehicles 200 in the network 100 as an access point. As a result, the mobile terminal 300D can connect to the network 100 and communicate by using a nearby vehicle 200 as an access point. This establishes a reciprocal relationship in which a vehicle 200 in the network 100 functions as an access point for the mobile terminal 300D and the mobile terminal 300D functions as a constituent element of the network 100 (a relay).

Summary of Embodiments

The foregoing embodiments disclose at least the following network management apparatus, network management method, and storage medium.

Item 1

A network management apparatus comprising a processor configured to:

in a network constituted by a plurality of vehicles and a plurality of mobile terminals having wireless communication functions, detect a vehicle and a mobile terminal which can be used as a next hop of a predetermined vehicle among the plurality of vehicles, the next hop being for predetermined communication originating from or relayed by the predetermined vehicle; and when a vehicle which can be used as the next hop is detected, preferentially select the vehicle that has been detected as the next hop, and when a vehicle which can be used as the next hop is not detected and a mobile terminal which can be used as the next hop is detected, select the mobile terminal that has been detected as the next hop.

According to this embodiment, even if a vehicle which can be used as the next hop for a predetermined vehicle is not detected, if a mobile terminal which can be used as the next hop is present, that mobile terminal can be selected as the next hop. Therefore, according to this embodiment, the stability of communication in a network including a plurality of vehicles can be improved. Additionally, because a vehicle is preferentially selected as the next hop, power consumption can be suppressed in mobile terminals, which typically have low battery capacities.

Item 2

The network management apparatus according to item 1, wherein the processor is further configured to:

when a vehicle and a mobile terminal which can be used as the next hop are detected, predict a communication stability, as the next hop, of the vehicle that has been detected, wherein when the communication stability is less than a threshold, the processor selects the mobile terminal that has been detected as the next hop.

According to this embodiment, the stability of communication can be improved.

Item 3

The network management apparatus according to item 2, wherein the processor predicts the communication stability on the basis of at least one of a relative position, a relative travel direction, and a radio wave strength of the predetermined vehicle.

According to this embodiment, a usable period can be predicted effectively.

Item 4

The network management apparatus according to item 1, wherein the mobile terminal selected as the next hop by the processor is a mobile terminal that is connected to the network by using the predetermined vehicle as an access point.

According to this embodiment, a reciprocal relationship is established, in which the predetermined vehicle functions as an access point for a mobile terminal, and the mobile terminal functions as a relay for the predetermined vehicle.

Item 5

The network management apparatus according to item 1, wherein the processor is further configured to:

receive, from a specific mobile terminal that is not a constituent element of the network, permission information indicating permission to add the specific mobile terminal to the network as a constituent element; and in response to the permission information being received from the specific mobile terminal, add the specific mobile terminal to the network as a constituent element and permit the specific mobile terminal to use one of the plurality of vehicles as an access point.

According to this embodiment, a reciprocal relationship is established, in which a vehicle in the network 100 functions as an access point for the mobile terminal and the mobile terminal functions as a constituent element of the network (a relay).

Item 6

The network management apparatus according to item 1, wherein the processor detects the vehicle and the mobile terminal which can be used as the next hop on the basis of (i) a position of the predetermined vehicle and (ii) a position of at least a part of the plurality of vehicles aside from the predetermined vehicle and the plurality of mobile terminals.

According to this embodiment, the vehicle and the mobile terminal which can be used as the next hop can be detected effectively.

Item 7

The network management apparatus according to item 1, wherein the processor detects the vehicle and the mobile terminal which can be used as the next hop on the basis of a radio wave strength for wireless communication between (i) the predetermined vehicle and (ii) each of at least a part of the plurality of vehicles aside from the predetermined vehicle and the plurality of mobile terminals.

According to this embodiment, the vehicle and the mobile terminal which can be used as the next hop can be detected effectively.

Item 8

The network management apparatus according to item 1, wherein the processor is further configured to:

when the mobile terminal detected by the processor is selected as the next hop, provide benefit information to the mobile terminal that has been selected.

According to this embodiment, compensation can be provided to a mobile terminal used as a relay in the network.

Item 9

The network management apparatus according to item 1, wherein the plurality of vehicles are configured to communicate with other vehicles using a first communication system and communicate with the mobile terminals using a second communication system different from the first communication system.

According to this embodiment, different communication systems can be used for vehicle-to-vehicle communication and vehicle-to-mobile terminal communication.

Item 10

The network management apparatus according to item 9, wherein the processor is further configured to:

detect an object that blocks radio waves of the first communication system in a vicinity of the predetermined vehicle, wherein when the object is detected by the processor while the vehicle detected by the processor is selected as the next hop and a mobile terminal which can be used as the next hop is detected by the processor, the processor switches the next hop to the mobile terminal that has been detected.

According to this embodiment, the likelihood of a communication route being cut off by a blocking object can be reduced.

Item 11

The network management apparatus according to item 10, wherein the processor detects the object by referring to map information.

According to this embodiment, a blocking object can be detected effectively.

Item 12

The network management apparatus according to item 10, wherein the processor detects the object by at least one of analyzing an image captured by an image sensor of the predetermined vehicle, analyzing information detected by a radar of the predetermined vehicle, and analyzing information detected by a lidar of the predetermined vehicle.

According to this embodiment, a blocking object can be detected effectively.

Item 13

A network management method executed by a network management apparatus, comprising:

in a network constituted by a plurality of vehicles and a plurality of mobile terminals having wireless communication functions, detecting a vehicle and a mobile terminal which can be used as a next hop of a predetermined vehicle among the plurality of vehicles, the next hop being for predetermined communication originating from or relayed by the predetermined vehicle; and when a vehicle which can be used as the next hop is detected, preferentially selecting the vehicle that has been detected as the next hop, and when a vehicle which can be used as the next hop is not detected and a mobile terminal which can be used as the next hop is detected, selecting the mobile terminal that has been detected as the next hop.

According to this embodiment, even if a vehicle which can be used as the next hop for a predetermined vehicle is not detected, if a mobile terminal which can be used as the next hop is present, that mobile terminal can be selected as the next hop. Therefore, according to this embodiment, the stability of communication in a network including a plurality of vehicles can be improved. Additionally, because a vehicle is preferentially selected as the next hop, power consumption can be suppressed in mobile terminals, which typically have low battery capacities.

Item 14

A non-transitory computer-readable storage medium which stores a program for causing a computer to execute a network management method comprising:

in a network constituted by a plurality of vehicles and a plurality of mobile terminals having wireless communication functions, detecting a vehicle and a mobile terminal which can be used as a next hop of a predetermined vehicle among the plurality of vehicles, the next hop being for predetermined communication originating from or relayed by the predetermined vehicle; and when a vehicle which can be used as the next hop is detected, preferentially selecting the vehicle that has been detected as the next hop, and when a vehicle which can be used as the next hop is not detected and a mobile terminal which can be used as the next hop is detected, selecting the mobile terminal that has been detected as the next hop.

According to this embodiment, even if a vehicle which can be used as the next hop for a predetermined vehicle is not detected, if a mobile terminal which can be used as the next hop is present, that mobile terminal can be selected as the next hop. Therefore, according to this embodiment, the stability of communication in a network including a plurality of vehicles can be improved. Additionally, because a vehicle is preferentially selected as the next hop, power consumption can be suppressed in mobile terminals, which typically have low battery capacities.

Note that no particular limitation is intended with regard to the specific configurations of software and hardware for implementing various types of functions that have been described in the foregoing embodiments. Arbitrary software, arbitrary hardware, and an arbitrary combination of arbitrary software and arbitrary hardware are encompassed within the scope of the foregoing embodiments, as long as they are technically possible.

Although the embodiments of the invention have been described above, the invention is not limited to the foregoing embodiments, and various variations/changes are possible within the spirit of the invention.

What is claimed is:

1. A network management apparatus comprising:
at least one processor circuit with a memory comprising instructions, that when executed by the processor circuit, causes the at least one processor circuit to at least:
in a network constituted by a plurality of vehicles and a plurality of mobile terminals having wireless communication functions, detect a vehicle and a mobile terminal which can be used as a next hop of a predetermined vehicle among the plurality of vehicles, the next hop being for predetermined communication originating from or relayed by the predetermined vehicle;
when a vehicle and a mobile terminal which can be used as the next hop are detected, predict a communication stability, as the next hop, of the vehicle that has been detected; and
when the vehicle and the mobile terminal which can be used as the next hop is detected:
in a case where the communication stability of the vehicle that has been detected is equal to or more than a threshold, select the vehicle that has been detected as the next hop;
in a case where the communication stability of the vehicle that has been detected is less than the threshold, select the mobile terminal that has been detected as the next hop; and
when a vehicle which can be used as the next hop is not detected and a mobile terminal which can be used as the next hop is detected, select the mobile terminal that has been detected as the next hop.

2. The network management apparatus according to claim 1, wherein the instructions further cause the processor circuit to predict the communication stability on the basis of at least one of a relative position, a relative travel direction, and a radio wave strength of the predetermined vehicle.

3. The network management apparatus according to claim 1,
wherein the mobile terminal selected as the next hop is a mobile terminal that is connected to the network by using the predetermined vehicle as an access point.

4. The network management apparatus according to claim 1, wherein the instructions further cause the processor circuit to:

receive, from a specific mobile terminal that is not a constituent element of the network, permission information indicating permission to add the specific mobile terminal to the network as a constituent element; and in response to the permission information being received from the specific mobile terminal, add the specific mobile terminal to the network as a constituent element and permit the specific mobile terminal to use one of the plurality of vehicles as an access point.

5. The network management apparatus according to claim 1,
wherein the instructions further cause the processor circuit to detect the vehicle and the mobile terminal which can be used as the next hop on the basis of (i) a position of the predetermined vehicle and (ii) a position of at least a part of the plurality of vehicles aside from the predetermined vehicle and the plurality of mobile terminals.

6. The network management apparatus according to claim 1,
wherein the instructions further cause the processor circuit to detect the vehicle and the mobile terminal which can be used as the next hop on the basis of a radio wave strength for wireless communication between (i) the predetermined vehicle and (ii) each of at least a part of the plurality of vehicles aside from the predetermined vehicle and the plurality of mobile terminals.

7. The network management apparatus according to claim 1, wherein the instructions further cause the processor circuit to:
when the mobile terminal detected by the processor circuit is selected as the next hop, provide benefit information to the mobile terminal that has been selected.

8. The network management apparatus according to claim 1,
wherein the plurality of vehicles are configured to communicate with other vehicles using a first communication system and communicate with the mobile terminals using a second communication system different from the first communication system.

9. The network management apparatus according to claim 8, wherein the instructions further cause the processor circuit to:
detect an object that blocks radio waves of the first communication system in a vicinity of the predetermined vehicle,
wherein when the object is detected by the processor circuit while the vehicle detected by the processor circuit is selected as the next hop and a mobile terminal which can be used as the next hop is detected by the processor circuit, the instructions further cause the processor circuit to switch the next hop to the mobile terminal that has been detected.

10. The network management apparatus according to claim 9,
wherein the instructions further cause the processor circuit to detect the object by referring to map information.

11. The network management apparatus according to claim 9,
wherein the instructions further cause the processor circuit to detect the object by at least one of analyzing an image captured by an image sensor of the predetermined vehicle, analyzing information detected by a radar of the predetermined vehicle, and analyzing information detected by a lidar of the predetermined vehicle.

12. A network management method executed by a network management apparatus, comprising:
in a network constituted by a plurality of vehicles and a plurality of mobile terminals having wireless communication functions, detecting a vehicle and a mobile terminal which can be used as a next hop of a predetermined vehicle among the plurality of vehicles, the next hop being for predetermined communication originating from or relayed by the predetermined vehicle;
when a vehicle and a mobile terminal which can be used as the next hop are detected, predicting a communication stability, as the next hop, of the vehicle that has been detected; and
when the vehicle and the mobile terminal which can be used as the next hop is detected,
in a case where the communication stability of the vehicle that has been detected is equal to or more than a threshold, selecting the vehicle that has been detected as the next hop;
in a case where the communication stability of the vehicle that has been detected is less than the threshold, selecting the mobile terminal that has been detected as the next hop; and
when a vehicle which can be used as the next hop is not detected and a mobile terminal which can be used as the next hop is detected, selecting the mobile terminal that has been detected as the next hop.

13. A non-transitory computer-readable storage medium which stores a program for causing a computer to execute a network management method comprising:
in a network constituted by a plurality of vehicles and a plurality of mobile terminals having wireless communication functions, detecting a vehicle and a mobile terminal which can be used as a next hop of a predetermined vehicle among the plurality of vehicles, the next hop being for predetermined communication originating from or relayed by the predetermined vehicle;
when a vehicle and a mobile terminal which can be used as the next hop are detected, predicting a communication stability, as the next hop, of the vehicle that has been detected; and
when the vehicle and the mobile terminal which can be used as the next hop is detected:
in a case where the communication stability of the vehicle that has been detected is equal to or more than a threshold, selecting the vehicle that has been detected as the next hop;
in a case where the communication stability of the vehicle that has been detected is less than the threshold, selecting the mobile terminal that has been detected as the next hop; and
when a vehicle which can be used as the next hop is not detected and a mobile terminal which can be used as the next hop is detected, selecting the mobile terminal that has been detected as the next hop.

\* \* \* \* \*